US012658496B2

(12) United States Patent
Schröter et al.

(10) Patent No.: US 12,658,496 B2
(45) Date of Patent: Jun. 16, 2026

(54) HEAT SINK

(71) Applicant: Fränkische Industrial Pipes GMBH & CO. KG, Königsberg (DE)

(72) Inventors: Dirk Schröter, Pfarrweisach (DE); Mike Jurikschka, Schweinfurt (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 95 days.

(21) Appl. No.: 18/693,054

(22) PCT Filed: Sep. 13, 2022

(86) PCT No.: PCT/EP2022/075368
§ 371 (c)(1),
(2) Date: Mar. 18, 2024

(87) PCT Pub. No.: WO2023/046530
PCT Pub. Date: Mar. 30, 2023

(65) Prior Publication Data
US 2025/0132411 A1     Apr. 24, 2025

(30) Foreign Application Priority Data
Sep. 23, 2021     (DE) ..................... 10 2021 124 621.0

(51) Int. Cl.
H01M 10/643          (2014.01)
B29C 48/00           (2019.01)
(Continued)

(52) U.S. Cl.
CPC ....... H01M 10/643 (2015.04); B29C 48/0017 (2019.02); B29C 48/11 (2019.02);
(Continued)

(58) Field of Classification Search
CPC ........................ H01M 50/213; H01M 10/6568
See application file for complete search history.

(56) References Cited

U.S. PATENT DOCUMENTS 6,228,524 B1     5/2001     Koehler et al.
6,364,008 B1 *   4/2002     Mannoni ............... F28D 7/0041
                                                    165/910

(Continued)

FOREIGN PATENT DOCUMENTS

CN       107910616 A    *   4/2018    .......... H01M 10/653
CN       108134160 A    *   6/2018    .......... H01M 10/655
(Continued)

OTHER PUBLICATIONS

German Publication No. 102021124621.0, Office Action mailed May 12, 2022, 11 pages.
(Continued)

*Primary Examiner* — Nelson J Nieves
(74) *Attorney, Agent, or Firm* — Kilpatrick Townsend & Stockton LLP

(57) ABSTRACT

Disclosed is a device for regulating the temperature of cylindrical components and a cooling system including at least two devices for regulating the temperature of cylindrical components. The device includes an elongate base profile that defines in its interior a plurality of at least two fluid flow channels arranged in series in the transverse direction and are separated by webs. The elongate base profile has main surfaces that each have an alternating sequence of concave regions and straight regions.

14 Claims, 4 Drawing Sheets

(51) Int. Cl.
|  |  |
|---|---|
| *B29C 48/11* | (2019.01) |
| *H01M 10/613* | (2014.01) |
| *H01M 10/625* | (2014.01) |
| *H01M 10/6568* | (2014.01) |
| *B29L 31/34* | (2006.01) |

(52) U.S. Cl.
CPC ....... *H01M 10/613* (2015.04); *H01M 10/625* (2015.04); *H01M 10/6568* (2015.04); *B29L 2031/3468* (2013.01); *H01M 2220/20* (2013.01)

(56) References Cited

U.S. PATENT DOCUMENTS

| | | | | |
|---|---|---|---|---|
| 8,418,365 | B2 * | 4/2013 | German | F28D 9/0031 |
| | | | | 29/890.035 |
| 9,316,450 | B2 * | 4/2016 | Engelhardt | F28F 1/22 |
| 2004/0069620 | A1 * | 4/2004 | Bitsche | H01M 50/213 |
| | | | | 204/267 |
| 2005/0170240 | A1 * | 8/2005 | German | B60L 50/66 |
| | | | | 429/120 |
| 2005/0170241 | A1 * | 8/2005 | German | H01M 10/663 |
| | | | | 429/120 |
| 2008/0311468 | A1 * | 12/2008 | Hermann | B60L 50/64 |
| | | | | 429/120 |
| 2009/0023056 | A1 | 1/2009 | Adams et al. | |
| 2013/0230760 | A1 * | 9/2013 | Pan | H01M 10/4207 |
| | | | | 429/120 |
| 2015/0349389 | A1 * | 12/2015 | Kobune | B60L 3/0046 |
| | | | | 429/90 |
| 2017/0162922 | A1 * | 6/2017 | Sumpf, Jr. | H01M 10/6557 |
| 2018/0131055 | A1 | 5/2018 | Yang | |
| 2018/0252481 | A1 * | 9/2018 | Tian | F28F 1/126 |
| 2018/0301674 | A1 * | 10/2018 | Lee | H01M 50/186 |
| 2021/0135305 | A1 * | 5/2021 | David | H01M 10/625 |
| 2021/0167444 | A1 * | 6/2021 | Gaigg | H01M 10/613 |
| 2021/0242517 | A1 * | 8/2021 | Sehl | H01M 10/643 |
| 2021/0320343 | A1 * | 10/2021 | Flannery | H01M 10/6568 |
| 2021/0367288 | A1 * | 11/2021 | Tong | H01M 10/6555 |
| 2022/0006135 | A1 * | 1/2022 | Flannery | H01M 10/0525 |
| 2022/0093994 | A1 * | 3/2022 | Becker | H01M 10/6568 |
| 2022/0263159 | A1 * | 8/2022 | Flannery | F28F 1/08 |
| 2022/0302522 | A1 | 9/2022 | Lee | |
| 2023/0087721 | A1 * | 3/2023 | Oyake | H01M 50/213 |
| | | | | 429/120 |
| 2023/0133221 | A1 * | 5/2023 | Oyake | H01M 10/643 |
| | | | | 429/62 |
| 2023/0147569 | A1 * | 5/2023 | Darbandi | H01M 50/213 |
| | | | | 429/120 |
| 2023/0253646 | A1 * | 8/2023 | Tushar | H01M 10/6551 |
| | | | | 429/72 |
| 2023/0361406 | A1 * | 11/2023 | Liu | H01M 10/647 |
| 2024/0030533 | A1 * | 1/2024 | Faltermeier | H01M 50/244 |
| 2024/0258612 | A1 * | 8/2024 | Meyer | H01M 10/643 |

FOREIGN PATENT DOCUMENTS

| | | | | |
|---|---|---|---|---|
| CN | 110313100 | A | * 10/2019 | H01M 50/213 |
| CZ | 308628 | B6 | 1/2021 | |
| DE | 102016200088 | A1 | 7/2017 | |
| WO | 2021034108 | A1 | 2/2021 | |

OTHER PUBLICATIONS

International Application No. PCT/EP2022/075368, International Search Report and Written Opinion mailed Jan. 9, 2023, 18 pages.

\* cited by examiner

HEAT SINK

The invention relates to a device for regulating the temperature of cylindrical components.

The issue of battery cooling is becoming increasingly important, particularly in the course of electromobility. Currently, cylindrical battery cells are usually brought into contact with metallic heat sinks, which can be used to dissipate the heat generated by the battery cells. However, metal heat sinks have the disadvantage that they are relatively expensive in terms of material and production and also significantly increase the weight of the battery unit. However, metal has a good thermal conductivity coefficient.

It is therefore the object of the present invention to provide a heat sink which can be produced from plastic and which has improved cooling properties.

This object is achieved according to the invention in a first aspect by a device for regulating the temperature cylindrical components, comprising an elongate base profile having a first and a second main surface, each of which, viewed in a longitudinal direction, extends between the two longitudinal ends of the base profile and, viewed in a transverse direction, extends between two side surfaces, wherein the base profile defines in its interior a plurality of at least two fluid flow channels, which each extend from one longitudinal end of the base profile to the other longitudinal end of the base profile, wherein the fluid flow channels are arranged in series in the transverse direction and separated by webs, wherein the main surfaces each have an alternating sequence of concave regions and straight regions, wherein a concave region of the first main surface, viewed in a thickness direction of the base profile, which extends both orthogonally to the longitudinal direction and orthogonally to the transverse direction, is at least in part superposed by a straight region of the second main surface, wherein a straight region substantially defines a plane which extends in the longitudinal direction and the transverse direction.

It should already be indicated at this point that a straight region in the sense of the present invention does not have to be perfectly straight in order to fulfill the inventive concept, but can also be slightly curved. This means that depressions and/or elevations can also be arranged within a straight region, which can occur, for example, during production or due to thermally induced material changes.

Accordingly, the device according to the invention represents a heat sink which has an elongated base profile, which in turn is bounded by two main surfaces and two side surfaces. Both the two main surfaces and the two side surfaces extend completely over the totality of the base profile of the device, wherein the two main surfaces and the two side surfaces are opposite one another. Furthermore, the surface of the two main surfaces is designed to be significantly larger than the surface of the two side surfaces.

According to the invention, the two main surfaces comprise concave regions and straight regions in an alternating sequence, while the two side surfaces are designed substantially uniformly, particularly along their longitudinal direction of extension, wherein the side surfaces can be designed either planar or convex, for example. If the side surfaces have convex surfaces, these can extend from one main surface to the other main surface with a radius of curvature of between 1 mm and 2 mm, preferably with a radius of 1.5 mm. If the side surfaces are arranged planar, the normal vectors of the side surfaces extend parallel to the transverse direction of the base profile. At this location, it should be mentioned that the concave main surface regions are curved inwards in relation to the elongated basic profile of the device according to the invention. The straight regions of the main surfaces have normal vectors that extend parallel to the thickness direction of the base profile of the device.

The main surfaces and side surfaces define an interior of the base profile, which has a plurality of longitudinal fluid flow channels, wherein two adjacent fluid flow channels are separated from one another by a respective web extending in the longitudinal direction and parallel to the thickness direction of the base profile. Accordingly, each channel is particularly defined by a web, the first and second main surfaces and either a side surface or a further web, whereby depending on the desired number of fluid flow channels, for example six fluid flow channels, a plurality of webs, in the above example five webs, can be provided. The webs can extend inside the device, particularly in a straight line from the first main surface to the opposite second main surface, wherein a cross-section of a fluid flow channel can accordingly be designed to be substantially rectangular.

The base profile can have a width of 50 mm to 100 mm in the transverse direction, preferably 75 mm, and a height of 2 mm to 6 mm in the thickness direction. The height of the base profile can vary due to the alternating sequence of concave and straight regions of the first main surface and the offset sequence of concave and straight regions of the second main surface. For example, the shortest distance between the two main surfaces can be 3 mm at a location on the base profile where, viewed in the thickness direction, two concave regions overlap and 4.5 mm at a location where, also viewed in the thickness direction, a straight region of the first main surface is opposite a concave region of the second main surface.

Cooling of the cylindrical component is achieved by a cooling fluid, for example a water-glycol mixture, which flows through the fluid flow channels inside the device according to the invention. For this purpose, the dimensions of the device, in particular the concave regions of the main surfaces, can be based on the dimensions of the component to be cooled, wherein the latter can have a diameter of 30 mm to 60 mm and a length of 60 mm to 100 mm, in particular a diameter of 45.6 mm and a length of 79.6 mm, so that the corresponding dimensions of the concave regions of the main surfaces can be derived from this.

It should be noted at this point that the device according to the invention is described herein as a cooling device, although the device could also be used for heating components. Only a fluid at a higher temperature needs to be used.

Due to the alternating sequence of the concave and straight regions of the two main surfaces, the device according to the invention substantially has a wave-like structure along the longitudinal direction of extension, the wave troughs of which are designed by the concave regions and the wave crests by the straight regions. However, the wave crests are designed to be flattened by the straight regions of the main surfaces. In addition, the straight regions of the two main surfaces are shorter in their longitudinal direction of extension than the concave regions, whereby a concave region of the first or second main surface is only partially overlaid by a straight region of the opposite second or first main surface, viewed in the thickness direction.

Advantageously, viewed in the longitudinal direction, the two ends of a concave region, which are each arranged at a transition to an adjacent straight region of the same main surface, are not overlapped by a straight region of the other opposite main surface, viewed in the thickness direction. In the longitudinal viewing direction, a concave region of a main surface can merge at its ends into a straight region of the same main surface, wherein an edge is particularly created. It should be added, however, that this edge can of course also have a radius or chamfer to make it easier to remove the base profile after thermoforming. In comparison to a basic profile with a wave-like structure with a constant thickness (or height, as used above), in which a concave region merges tangentially into a flank and this subsequently merges tangentially into a convex region, the basic profile designed according to the invention has the advantage that a contact surface of the device according to the invention with the cylindrical component to be cooled can be increased in that the concave regions with a constant radius of curvature are extended up to the transition into a respective straight region, which has an advantageous effect on the cooling properties of the device. Particularly in the case of a plurality of cylindrical components to be cooled, the described arrangement of the device according to the invention can enable improved cooling of those components. This arrangement also allows the component to be cooled to be efficiently secured in position.

In a further embodiment of the present invention, the superposition of a concave region of the first main surface with a straight region of the second main surface can be designed symmetrically. In the device according to the invention, an apex (a center) of a concave region of one main surface may face a longitudinal center of a straight region of the other main surface as viewed in the thickness direction. Thanks to the symmetrical design, an optimized and uniform arrangement of the cylindrical components to be cooled can be achieved. In addition, the flow properties can be kept substantially constant over the length of the base profile.

Further, the basic profile of the device according to the invention can be made of plastic by extrusion. Although plastics have a lower coefficient of thermal conductivity compared to metals, the use of plastic in the course of the device according to the invention can be considered particularly advantageous. In particular, the low weight of plastics can lead to a significant reduction in the overall weight of the device and accordingly also of a vehicle, for example an electric car, in which cylindrical battery cells to be cooled are accommodated by the device according to the invention. As a result, the electric car's batteries need to use less energy to power the electric car, which can have a particularly positive effect on the maximum range of the electric car. Furthermore, costs can be reduced by using plastic, as this material is significantly cheaper to procure and process than metal. Further, plastic has electrical insulation properties that can prevent current from being passed on, for example in the event of a battery cell malfunction.

With regard to the specific arrangement of the device according to the invention, a desired cooling of the cylindrical components to be cooled can be ensured despite the low thermal conductivity coefficient of plastic, since the wall thickness of the main surfaces of the base profile can be designed to be sufficiently small that an efficient heat exchange between cooling fluid, which flows through the fluid flow channels, and the cylindrical components can be achieved. The wall thickness of the fluid flow channels can therefore have the thinnest possible thickness, for example a wall thickness of 0.4 mm to 0.8 mm, preferably a wall thickness of 0.5 mm to 0.6 mm.

In a preferred embodiment of the device according to the invention, the material from which the base profile is made may comprise polyketones and/or polyamide, particularly PA6. Both polyketones and polyamide advantageously have a high chemical resistance and dimensional stability, which can have a positive effect on the durability of the device according to the invention. Alternatively or additionally, the material from which the base profile is made may comprise polyphenyl ether PPE.

Optionally, a connection portion can be arranged at a respective longitudinal end of the base profile of the device according to the invention, which is configured to introduce fluid flowing into the connection portion into the base profile or to discharge fluid coming from the base profile out of the connection portion. Consequently, up to two connection portions can be provided on a base profile, wherein the connection portions are particularly configured to introduce the fluid into the respective fluid flow channels at one longitudinal end of the base profile and to receive the fluid from all fluid flow channels provided in the base profile at the other longitudinal end of the base profile. A connection portion can be connected to the respective longitudinal end of the base profile in a fluid-tight, non-detachable manner, in particular welded, wherein the term "non-detachable" particularly refers to a connection which can only be released by irreversible separation or destruction. A fluid-tight connection between the base profile and the connection portion can ensure that no fluid can escape in an undesirable manner, thereby avoiding an unfavorable impairment of the cooling performance of the device according to the invention.

In a further embodiment of the device according to the invention, a connection portion may have three openings, namely an inlet, an outlet and a branch opening, at which branch opening the connection portion is fluidically connected to the base profile. Accordingly, fluid can first flow through the inlet into the connection portion and subsequently partially through the branch opening into the base profile and partially out of the outlet. To discharge the fluid heated by cooling a cylindrical component, it can be discharged at the other longitudinal end of the base profile via the branch opening into the connection portion and out of the connection portion through the outlet. The fluid flow path through successive connection portions or basic profiles will be described below with reference to a cooling system.

In a further development of the present invention, the inlet and the outlet of a connection portion can be designed to match one another, such that an inlet of a first connection portion can be connected in a fluid-tight manner to an outlet of a second connection portion identical to the first connection portion. In order to connect the two connection portions to one another in a fluid-tight manner, a groove can be provided at the inlet and/or the outlet, in which a seal, for example an O-ring, can be provided. A connection between the first connection portion and the second connection portion for generating a fluid passage can be advantageous particularly if a plurality of devices according to the invention are to be combined or arranged in series. For this purpose, either a male or a female connection piece can be provided at the inlet and outlet, wherein a stop can be provided on the male and/or female connection piece so that the male connection piece can be connected to the female connection piece in a predetermined position. The stop can ensure that a fluid flow via the branch opening of the connection portion is not blocked by inserting the male connection piece (e.g. the outlet of the first connection portion) into the female connection piece (e.g. the inlet of the second connection portion) and can thus be fed into/branched off from the fluid flow flowing between the inlet and outlet of a connection portion. Depending on the end of the base profile at which a connection portion is arranged, an incoming fluid or a fluid to be discharged can flow through the branch opening, which extends particularly parallel to the longitudinal direction of the elongated base profile.

Further, the inlet and the outlet of a connection portion of the device according to the invention can be configured to interlock with each other, so that unintentional disengagement of an inlet of a first connection portion from an outlet of a second connection portion identical to the first connection portion can be prevented. For this purpose, at least one latching hook can be provided on the inlet and/or the outlet of a first connection portion, which engages in at least one opposite counterpart, for example an undercut, on the outlet and/or the inlet of a second connection portion and thus secures both the inlet and the outlet in their respective positions relative to one another. Particularly in the case in which the longitudinal ends of the base profile, viewed in the thickness direction, are not arranged centrally, i.e. a distance in the thickness direction from a main surface of a longitudinal end to the straight regions of the same main surface, it can be advantageous if a connection portion has at least two latching positions. These latching positions can, for example, be designed with undercuts that are offset from one another and with which latching hooks can selectively engage.

In a preferred embodiment of the device according to the invention, at least one of the longitudinal ends of the base profile can be widened, such that a flow cross-section of the fluid flow channels is enlarged. This can be particularly advantageous when using an intermediate piece which is configured to connect one end of a base profile to a connection portion and which subsequently remains in the device, as this avoids a reduction in the flow cross-section at this connection point. For this purpose, the connection portion for connection to the intermediate piece can also be designed to be flared outwards. This avoidance of the reduction of the flow cross-section at the connection point can have a particularly beneficial effect on the fluid dynamics in the corresponding region.

In a second aspect, the object is achieved by a cooling system comprising at least two devices according to the invention, wherein each of the devices is connected at the longitudinal ends of the respective elongate base profile to a respective connection portion (as described in relation to the device according to the invention), particularly by welding, wherein the outlet of the connection portion of the first device is connected in a fluid-tight manner to the inlet of the second device and/or the inlet of the connection portion of the first device is connected in a fluid-tight manner to the outlet of the second device.

Additional latching hooks can be used to secure the connection between the inlets and outlets, as described above. In general, the cooling system can be expanded as often as required by connecting two devices via their inlets or outlets of the respective connection portions, allowing the cooling system to be adapted efficiently and effortlessly depending on the number of cylindrical components to be cooled.

The flow path of a cooling fluid through the cooling system according to the invention is described below. Cooling fluid can flow into the cooling system through an inlet of a first connection portion, which is connected to a first longitudinal end of a first device, and partially enters the base profile of the first device in the first connection portion through its branch opening. A major part of the cooling fluid flows through the first connection portion, particularly in a straight line, and leaves the first connection portion via its outlet. Subsequently, the cooling fluid is directed into the inlet of a second connection portion of a second device, branches off there again partially via its branch opening into the base profile of the second device, flows via the outlet of the second connection portion into the inlet of a third connection portion of a third device and so on until it reaches a last connection portion of a last device comprised in the cooling system in relation to the successive connection portions. The fluid then flows through the fluid flow channels inside a respective base profile, which ultimately enables the regulating of the temperature of the cylindrical components accommodated in concave regions of the main surfaces to be achieved.

The fluid heated by the heat exchange with the components can enter the base profiles at the respective second longitudinal ends through the branch openings of the corresponding connection portions. From the last device mentioned above, the cooling fluid flows from the outlet of the last connection portion at the second longitudinal end of the last base profile into the inlet of the penultimate connection portion at the second longitudinal end of the penultimate base profile and so on. Subsequently, the cooling fluid exits the cooling system via the outlet of the connection portion at the second longitudinal end of the first base profile. The flow sequence described has the advantage, firstly, that mixing of cool and heated fluid is avoided and, secondly, that only two connections need to be provided for the totality of the cooling system, namely a connection that can be connected to the inlet of the first connection portion at the first longitudinal end of the first base profile and supplies cooling fluid, and an outlet that can be connected to the outlet of the connection portion at the second longitudinal end of the first base profile and receives cooling fluid. At the ends opposite these connections, the connection portions of the last device can be closed with lids or designed as end pieces. The connections can be arranged on the same side of the cooling system or on opposite sides of the cooling system.

Optionally, an intermediate piece can be arranged between an outlet of the first device and an inlet of the second device, which extends the fluid channel formed by the outlet and the inlet in such a manner that a distance between the base profiles of the two devices can be increased. Thus, the cooling system can be easily adapted to accommodate battery cells with a larger diameter between the elongated base profiles of two adjacent devices without having to change the corresponding connection portions per se. Of course, it may be necessary to change the dimensions of the concave regions of the base profiles used. The intermediate piece can be designed to be flexible. This can be achieved, for example, by the intermediate piece comprising a corrugated pipe-like portion which allows a fluid inlet and a fluid outlet of the intermediate piece to be displaced relative to one another. Tolerances of the cooling system components, such as length tolerances of the base profile, can be compensated for by an intermediate piece designed in this manner. This in turn can make mounting the cooling system easier or reduce unfavorable stresses or even damage to the cooling system. In this context, it is further conceivable that the flexible intermediate piece is configured to be variable in its longitudinal extension. This means that, if necessary, the flexible intermediate piece can be lengthened or shortened in such a way that it can be adapted to a predetermined distance between the two devices mentioned above. The intermediate piece can also have a telescopic portion for the purpose of length adjustment. This telescopic portion can coincide with the corrugated portion or be designed separately.

For this purpose, the intermediate piece can have a male connection piece and/or sealing elements on one side and a female connection piece and/or sealing elements on the opposite side, analogous to the inlet or outlet as described above, and can optionally be brought into engagement with a latching hook attached to the inlet or outlet.

In a preferred embodiment of the cooling system according to the invention, the base profile of the first device can be arranged mirrored to a base profile of the second device, i.e. a concave region of the base profile of the first device is directly opposite a concave region of the base profile of the second device or a straight region of the base profile of the first device is directly opposite a straight region of the base profile of the second device. In other words, the main surfaces of the elongate base profiles of the first and second devices can be arranged relative to one another in such a manner that the concave regions of the base profile of the first and second devices, viewed in the thickness direction, face one another and are arranged mirror-symmetrically with respect to a center plane between the two base profiles. This means that the concave regions, viewed in the longitudinal direction of the two basic profiles, are opposite one another without offset. The symmetry plane can extend parallel to the main extension direction of the base profiles of the two devices and normal to the thickness direction of the base profiles of the first device and the second device. This specific arrangement allows a cylindrical hollow space to be defined, particularly by a concave region of the first device and an opposite concave region of the second device, in which a cylindrical component, for example a cylindrical battery cell, can be accommodated and secured for cooling. Such a cooling system allows a number of battery cells to be cooled simultaneously in an optimized spatial arrangement, which can be particularly important for an electric car.

In accordance with a third aspect of the present invention, the object is achieved by a method for producing a device for regulating the temperature of cylindrical components according to the invention, wherein the method comprises the steps of:

a) extruding an elongate base profile made of plastic, wherein the base profile has a first and a second main surface, each extending between the two longitudinal ends of the base profile when viewed in a longitudinal direction and between two side surfaces when viewed in a transverse direction, the base profile defining in its interior a plurality of at least two fluid flow channels, each extending from one longitudinal end of the base profile to the other longitudinal end of the base profile, the fluid flow channels being arranged in series in the transverse direction and separated by webs, b) deforming the base profile by means of thermoforming in such a way that the main surfaces each have an alternating sequence of concave regions and straight regions, wherein a concave region of the first main surface, viewed in a thickness direction of the base profile which extends both orthogonally to the longitudinal direction and orthogonally to the transverse direction, is overlaid at least in sections by a straight region of the second main surface, wherein a straight region substantially defines a plane which extends in the longitudinal direction and the transverse direction, c) connecting the elongate base profile at its longitudinal ends to a respective connection portion, particularly by welding, in order to produce a first device according to the invention, d) repeating steps a) to c) to produce a second device according to the invention, e) connecting the first device to the second device in such a manner that the outlet of the connection portion of the first device is fluid-tightly connected to the inlet of the second device and/or the inlet of the connection portion of the first device is fluid-tightly connected to the outlet of the second device.

The method according to the invention can be used to produce a plurality of devices which can be combined to form a cooling system. The number of devices required for a complete cooling system can be taken into account when carrying out the process in such a manner that steps d) and e) are repeated accordingly for third, fourth, etc. devices, wherein the dimensions of the cooling system can in turn be adapted to the number of components to be cooled, for example the battery cells. This makes it possible to determine the amount of material required for implementing the method and to perform the method accordingly. Advantageously, the method according to the invention thereby simplifies the manufacturing method of a battery unit comprising both the cooling system and the battery cells to be cooled.

Furthermore, the method described can reduce costs, as the production of a number of identical devices, which can be connected to each other via their connection portions, means that a cooling system of any size can be created. In contrast to the production of a cooling system in a single complex method step, the method according to the invention enables faster mounting of large cooling systems. The devices according to the invention or individual components thereof can be produced, for example, in a cost-efficient injection molding or extrusion process. In particular, the elongated base profile can be designed as a straight component in a single extrusion process in order to subsequently create the desired structure of the main surfaces and side surfaces by means of thermal processing.

It should be explicitly pointed out at this location that all the features, effects and advantages described in relation to the device according to the invention may also be applicable to the cooling system and/or method according to the invention, and vice versa.

The present invention will be described in greater detail below by means of an embodiment with reference to the accompanying drawings. In the figures.

Figure 1:
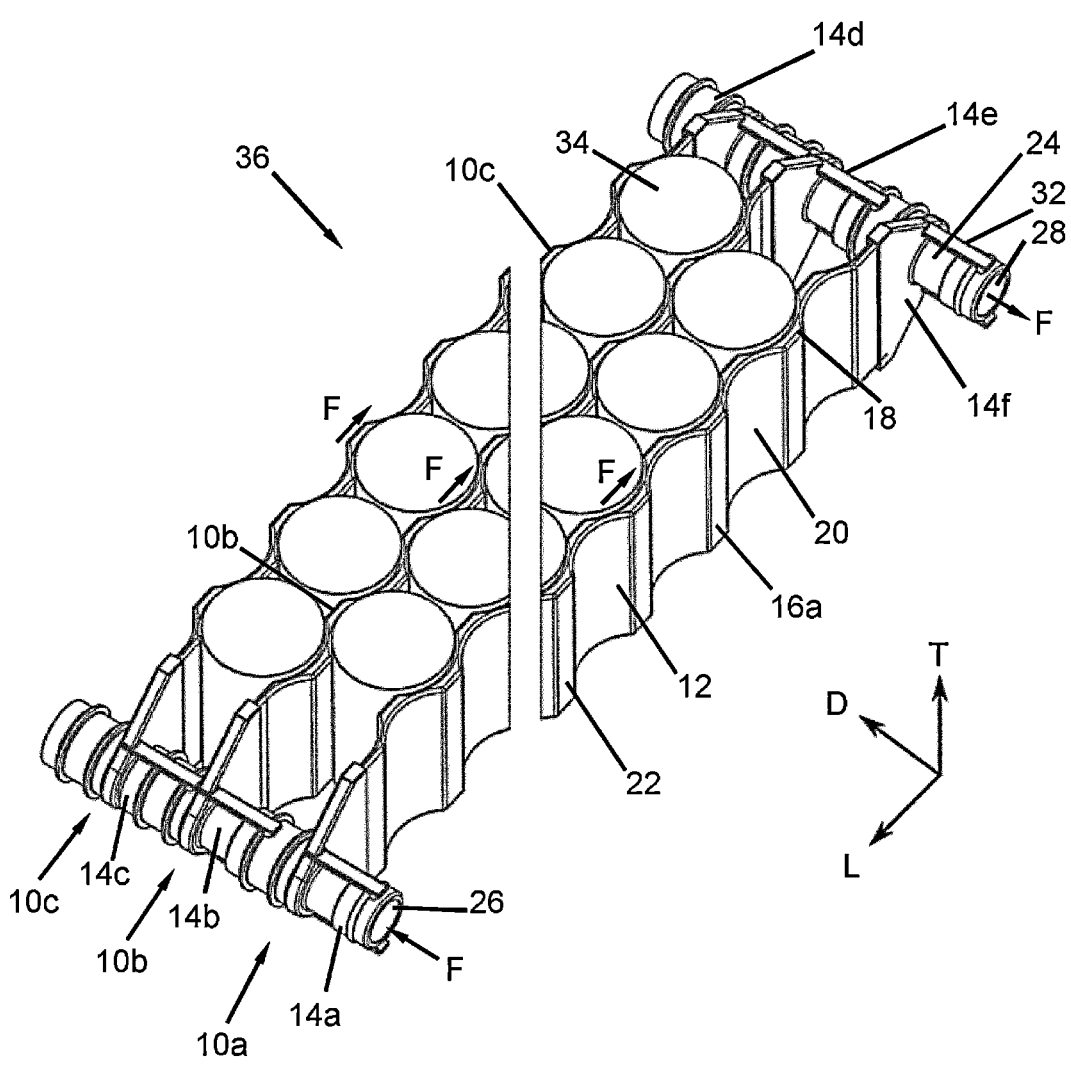
FIG. 1 shows a perspective view of a plurality of devices according to the invention, which in combination form a cooling system.

FIG. 1 shows a device according to the invention for regulating the temperature of cylindrical components in general, with the reference numerals 10 representing all identical devices. Further, three identical devices 10 are labeled in FIG. 1 as first device 10a, second device 1b and third device 10c to describe their relative arrangement. A device 10 comprises an elongate base profile 12 (also represented separately in FIG. 2), which extends along a longitudinal extension direction L, and two connection portions 14a, 14b, wherein a respective connection portion 14a or 14b is provided at a respective longitudinal end of the elongate base profile 12 and is connected thereto. Since the connection portions 14a and 14b are designed identically in the embodiment shown here, the reference numerals 14 are also generally used to refer to one connection portion, which is described as a representative of all connection portions. To ensure that no fluid can escape at the transition between a connection portion 14a, 14b and the base profile 12, these are connected to each other in a fluid-tight manner, particularly by welding.

Figure 2:
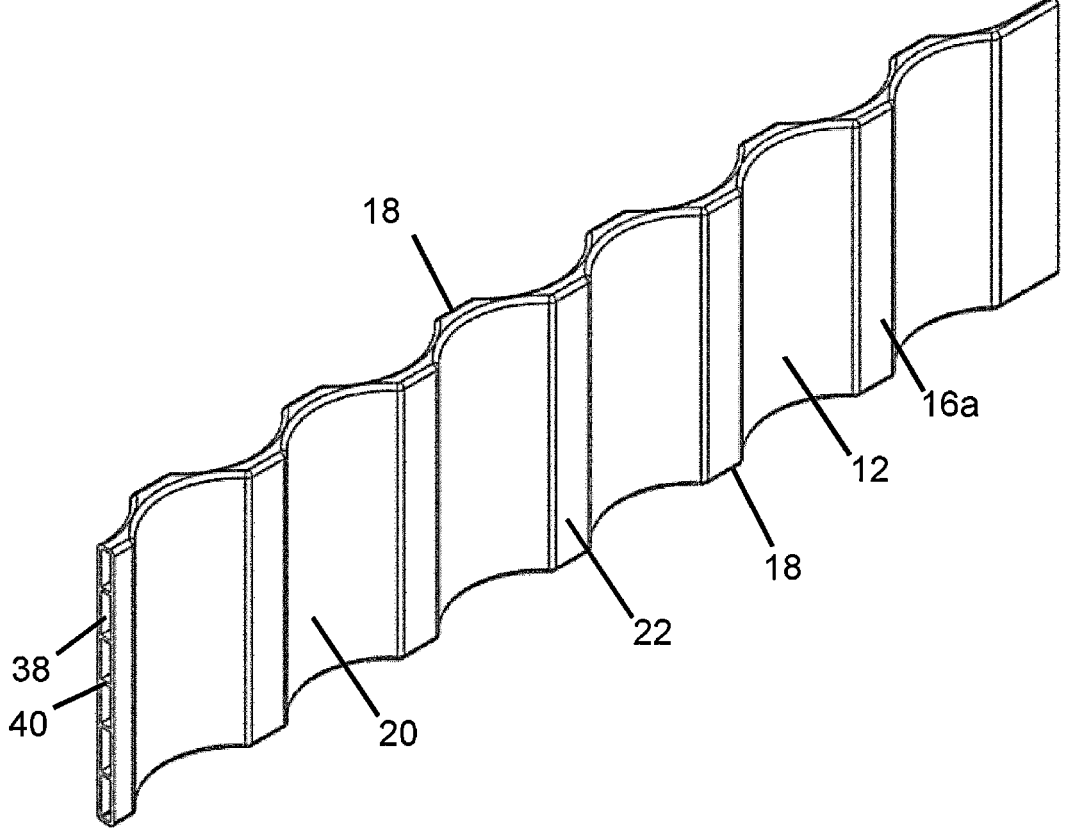
FIG. 2 shows a perspective view of a basic profile of a device according to the invention.
Figure 3:
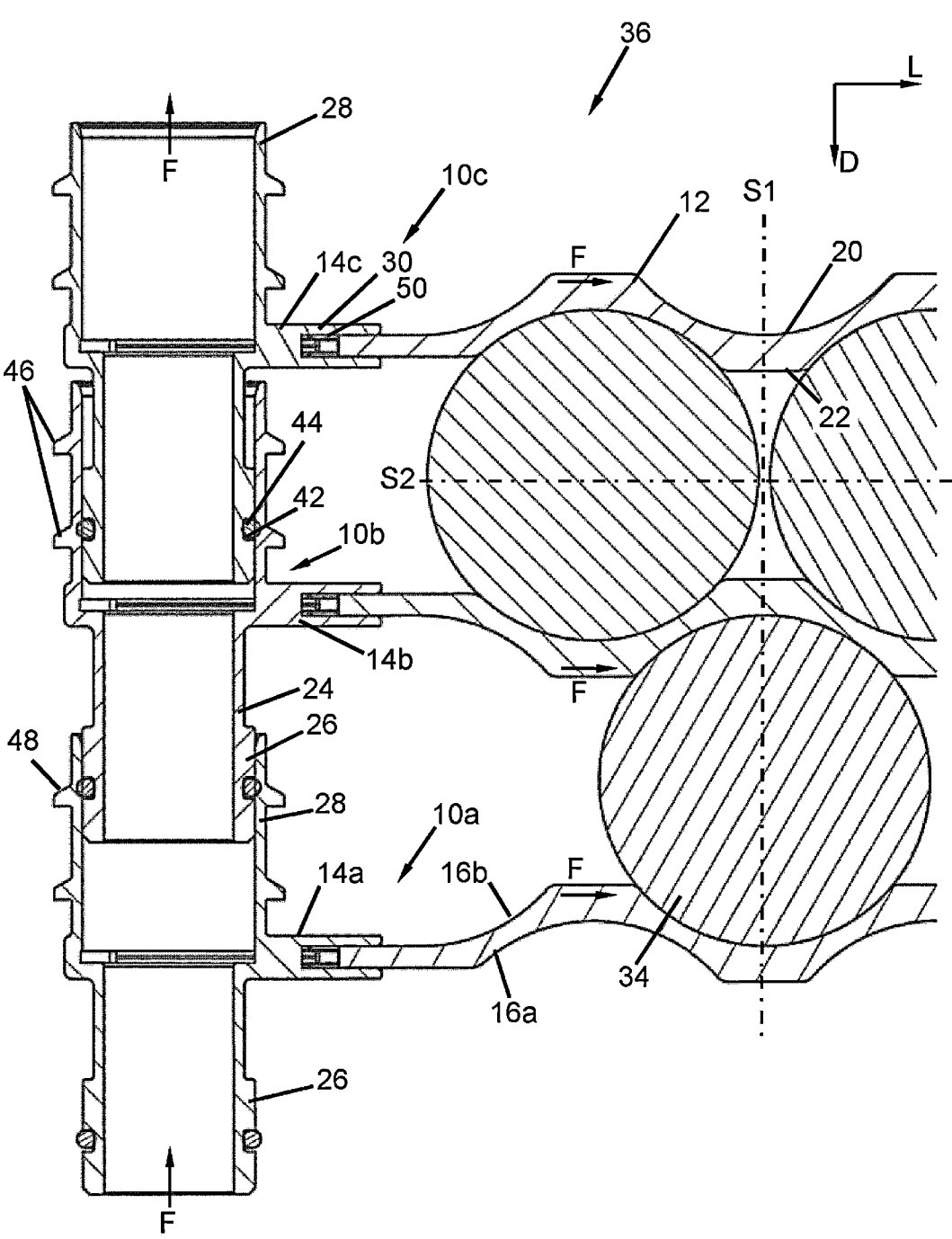
FIG. 3 shows a side cross-sectional view of a section of the cooling system.

The base profile 12 has first and second main surfaces 16a and 16b as well as two side surfaces 18, wherein for reasons of perspective only the surface 16a can be seen in FIG. 1, so that reference is made to FIG. 3 with regard to the surface 16b. The second main surface 16b, viewed in a thickness direction D which is orthogonal to the longitudinal direction L, is arranged on the exterior side of the base profile 12 opposite the first main surface 16a. Similarly, the two side surfaces 18, viewed in a transverse direction T which is orthogonal to the longitudinal direction L and the thickness direction D, are arranged on opposite short exterior sides of the base profile 12. The two main surfaces 16a and 16b together with the two side surfaces 18 define an inner hollow space (see FIGS. 2 and 3), which is configured to transport a cooling fluid. In addition, concave regions 20 and straight regions 22 of the elongate base profile 12 are represented in FIG. 1, which are arranged along the longitudinal direction L in an alternating sequence on the base profile 12 and form the respective main surface 16a and 16b.

FIG. 1 is provided with an interruption, which represents in particular that the devices 10 according to the invention or the basic profiles 12 of the devices 10 are not limited to a specific length, but can be designed to be dimensioned according to the requirement profile of the desired application, for example for cooling a determined number of battery cells.

Figure 4:
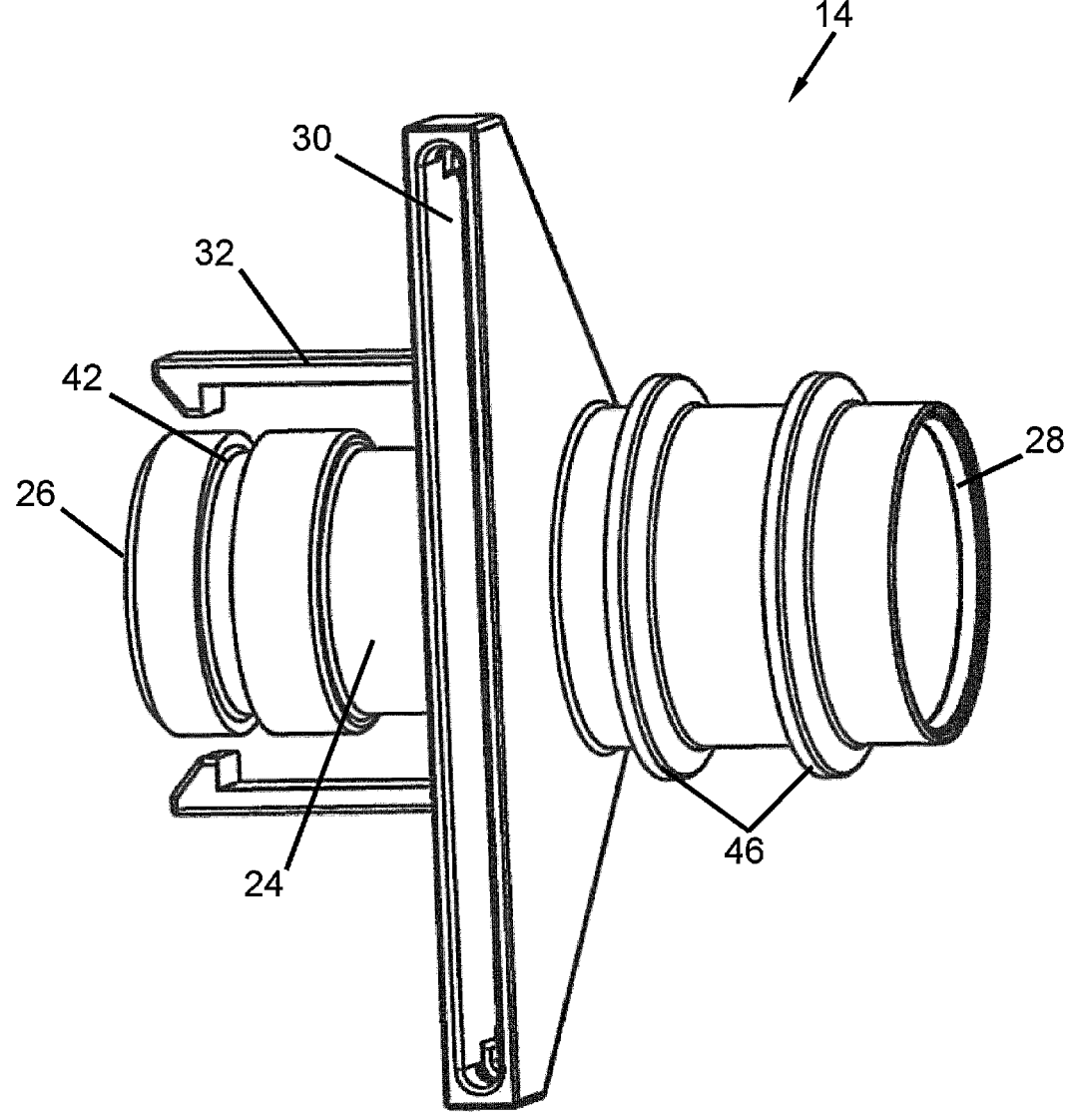
FIG. 4 shows a perspective view of a connection portion of a device according to the invention.

As can be seen in FIG. 4, a connection portion 14, which has a central cylindrical portion 24, comprises three openings corresponding to an inlet 26, through which the fluid can be fed into the device 10, an outlet 28, through which the fluid can be discharged from the device 10, and a branch opening 30, wherein the inlet 26 and the outlet 28 are defined according to the fluid flow direction F present. The cylindrical portion 24 forms the inlet 26 at one end and the outlet 28 at the other end. Inlet 26 and outlet 28 are designed in such a manner that either a further connection portion 14 or a line device (not shown in the figures), for example a hose or a pipe, through which the cooling fluid can be supplied or discharged, can be connected. Furthermore, the cylindrical portion 24 of a connection portion 14 comprises latching hooks 32, which can latch with a further connection portion 14 or a line device for securing the position. In order to be able to connect a connection portion 14 to a further connection portion 14, the inlet 26 or the outlet 28 are provided as a male or female connection piece.

For regulating the temperature of a cylindrical component 34, for example a battery cell, this is brought into contact with a concave region 20 of the main surfaces 16a or 16b of the base profile 12. Since cooling fluid flows through the hollow space inside the base profile 12, heat can be exchanged between component 34 and device 10. In order to optimize the heat exchange and thus the cooling effect, the concave regions 20 are designed in such a way that the largest possible contact surface is created between the main surface 16a, 16b and the component 34, as can be seen in FIG. 3.

In the following, a cooling system 36 according to the invention will be described, as represented in FIG. 1. The cooling system 36 here comprises the three devices 10a, 10b and 10c according to the invention, as already mentioned above. The first device 10a has a first inlet-side connection portion 14a, the second device 10b has a second inlet-side connection portion 14b and the third device 10c has a third inlet-side connection portion 14c at the first longitudinal ends of the respective base profiles 12. Accordingly, cooling fluid flows into the first connection portion 14a, from there partly into the base profile 12 of the first device 10a and partly from the first connection portion 14a into the second connection portion 14b, here again partly into the base profile 12 of the second device 10b and partly from the second connection portion 14b into the third connection portion 14c and into the base profile 12 of the third device 10c. On the opposite side, the cooling fluid flows from the base profile 12 of the third device 10c into a fourth connection portion 14d, from there into a fifth connection portion 14e, where it is brought together with cooling fluid which enters the fifth connection portion 14e from the base profile 12 of the second device 10b, subsequently this cooling fluid is again brought together with cooling fluid which enters a sixth connection portion 14f from the base profile 12 of the first device 10a. The cooling fluid leaves the cooling system 36 at the outlet 28 of the sixth connection portion 14f.

It should be indicated that the outlet 28 of the sixth connection portion 14f is a same portion of a connection portion 14 which forms the inlet 26 of the first connection portion 14a, due to the fluid flow direction in the sixth connection portion 14f being opposite to that in the first connection portion 14a. Alternatively, the main outlet of the cooling system 36, via which the cooling fluid leaves the cooling system 36, could be designed at the fourth connection portion 14d, so that the outlet 28 is arranged on a side of the cooling system 36 opposite the inlet 26.

By means of the connection portions 14a to 14f, the devices 10a, 10b, 10c are connected to each other on both sides and thus form the cooling system 36.

However, the number of devices 10 combined in a cooling system 36 can be changed as desired and is thus not limited to the configuration shown in FIG. 1, wherein a cooling system 36 comprises at least two devices 10a, 10b according to the invention or two elongate base profiles 12 and the associated four connection portions 14. Consequently, the cooling system 36 can be flexibly adapted with regard to the number of cylindrical components 34 to be cooled. In FIG. 1, a cooling fluid is fed into the cooling system 36 by way of example through an inlet 26 shown on the left in FIG. 1 and discharged through an outlet 28 shown on the right in FIG. 1. The arrows F represent the course of the cooling fluid through the cooling system 36

FIG. 1 also shows that a cylindrical component 34 is not only cooled on one side by a concave region 20 of a device 10, but is diametrically contacted on both sides by two concave regions 20 of two devices 10a and 10b. On the one hand, this achieves an improved cooling effect and, on the other hand, the cylindrical components 34 are secured in their position by the cooling system 36.

FIG. 2 shows an enlarged perspective view of a single base profile 12. In particular, the arrangement of the concave regions 20 and the straight regions 22 of the elongated base profile 12 can be seen again in detail. Substantially, the alternating sequence of concave regions 20 and straight regions 22 represents a wave-like structure comprising a wave crest and a wave trough, wherein a respective wave crest is designed flat by a straight region 22. The deepest wave trough, i.e. the apex, of a concave region 20 of the first main surface 16a is arranged opposite a straight region 22 of the second main surface 16b (wave crest) in the thickness direction D. With respect to a symmetry plane S1 (see FIG. 3), which extends in the transverse direction and which extends through an apex of a concave region 20 and a center of an opposite straight region 22, the individual regions 20 and 22 are arranged symmetrically as viewed in the longitudinal direction L.

The elongated base profile 12 is represented in FIG. 2 at one end in an open state, i.e. not connected to a connection portion 14. This particularly shows the arrangement of fluid flow channels 38, which are provided inside the base profile 12 and are configured to guide the cooling fluid. The fluid flow channels 38 are defined by the main surfaces 16a, 16b and the side surfaces 18 and by webs 40, respectively, wherein the webs 40 delimit the individual channels 38 from one another. The number of channels 38 and webs 40 is shown in FIG. 2 as six channels, i.e. five webs.

The illustrated arrangement of the base profile 12 enables efficient fluid flow through the interior of the base profile 12 or through the fluid flow channels 38, which reduces undesirable turbulence. Further, the webs 40 prevent the main surfaces 16a, 16b from curving inwards or outwards in the thickness direction D. In combination with the optimized contact surface of the concave regions 20, this can ensure a pronounced cooling effect of the cylindrical components 34 to be cooled.

A schematic cross-sectional view of two connected connection portions 14a and 14b is shown in FIG. 3. This view also shows the connection between a base profile 12 and a connection portion 14a, 14b at its branch opening 30. Fluid, which has previously entered the connection portion 14a via the inlet 26, is able to flow both through the totality of the cylindrical portion 24, and thus through the respective connection portions 14 of several connected devices 10, and to enter the associated base profile 12 through the branch opening 30 of a respective connection portion 14. The outlet 28 comprises a groove 42, which is configured to receive a seal 44, for example an O-ring, in order to fluidically seal the connection of two connection portions 14 at their inlet 26 and outlet 28.

Furthermore, it can be seen in FIG. 3 that two undercuts 46 are provided at a respective inlet 26, with which the locking hooks 32 can engage. Depending on how two adjacent base profiles 12 are arranged relative to one another, there may be a short or a longer distance, viewed in the thickness direction D, between the longitudinal ends of these two base profiles 12. Accordingly, the latching hooks 32 can latch into the first undercut 46 or into the second undercut 46.

The outlet 28 is designed here (due to the direction of fluid flow) as a female connection piece. The inlet 28 is designed here as a male connection piece. A stop 48 ensures that the branch opening 30 is not closed by the inlet 26 or the outlet 28. The stop 48 could also be designed with a coupling between the latching hook and undercut, which provides a position lock. The arrangement of the female or male connection piece on a connection portion 14 is only shown as an example in FIG. 3. It is quite possible that the inlet 26 may have the female connection piece and the outlet 28 accordingly comprises the male connection piece.

An intermediate element 50 can be used to connect the base profile 12 to a branch opening 30 of a connection portion 14, which can support the fluid flow channels 38, particularly the thin walls to the main surfaces 16a, 16b, during a connection process (e.g. laser welding). An expansion of the branch opening 30 and/or the fluid flow channels 36 can be provided at the longitudinal end of the base profile 12. This widening can make it possible to use an intermediate element 50 which defines fluid flow channels in its interior, the flow cross-section of which substantially corresponds to that of the fluid flow channels 38 of the base profile 12. In other words, the intermediate element 50 may be received in the flare such that the fluid flow channels 38 of the base section 12 are continued through the intermediate element 50. In this manner, a fluid-dynamically unfavorable bottleneck can be avoided. In an analogous manner to the intermediate piece described above, the intermediate element 50 can also be designed to be flexible and/or variable in length, for example telescopic.

Further, FIG. 3 illustrates the arrangement of the concave regions 20 and the straight regions 22 along the main surfaces 16a and 16b of a device 10 with respect to the longitudinal direction L and the thickness direction D. Along the longitudinal direction L, the concave regions 20 and the straight regions 22 are arranged such that the apex of a concave region is opposite the center of a straight region 22 as viewed in the thickness direction D through the base profile 12. If one now considers the alternating sequence of concave regions 20 and straight regions 22 along the main surfaces 16a and 16b along the longitudinal direction L, a symmetry plane S1 extending parallel to the thickness direction D and the transverse direction T extends through the apex of a concave region 20 and the opposite center of a straight region 22, to which a respective region 20 or 22 is designed symmetrically.

A further symmetry plane S2 can be generated here by the arrangement of two devices 10a and 10b in a cooling system 36 according to the invention, which extends in the middle between the two base profiles 12 of the two devices 10a and 10b, i.e, particularly through the center of a battery cell 34, and parallel to the longitudinal direction L and the transverse direction T. The devices 10a and 10b, which are arranged consecutively when viewed in the thickness direction D, each make equal contact with an identical battery cell 34 at their mutually facing concave regions 20 for the purpose of cooling and securing it. Both the concave regions 20 and the straight regions 22 of the two devices 10a, 10b are therefore arranged mirror-symmetrically to one another (with respect to the plane S2). In general, the radius of curvature of the concave regions 20 can be adjusted to match the diameter or radius of the battery cells 34 to be cooled in order to increase the contact surface between the device 10 and the battery cell 34 and thus increase the desired cooling effect.

The invention claimed is:

1. A device for regulating a temperature of cylindrical components, the device comprising an elongate base profile having a first main surface and a second main surface, each of which, when viewed in a longitudinal direction, extends between two longitudinal ends of the elongate base profile and, when viewed in a transverse direction, extends between two side surfaces, wherein the elongate base profile defines in an interior of the elongate base profile a plurality of fluid flow channels, the plurality of fluid flow channels comprising at least two fluid flow channels, which each run from one longitudinal end of the elongate base profile to another longitudinal end of the elongate base profile, wherein the plurality of fluid flow channels are arranged in series in the transverse direction and are defined by the first main surface, the second main surface, the two side surfaces, and webs, wherein the webs delimit individual fluid flow channels from one another, wherein the first and second main surfaces each have an alternating sequence of concave regions and straight regions, wherein at least one concave region of the first main surface, when viewed in a thickness direction of the elongate base profile, which runs both orthogonally to the longitudinal direction and orthogonally to the transverse direction, is at least in part superposed by at least one straight region of the second main surface, wherein at least one of the straight regions substantially defines a plane which extends in the longitudinal direction and the transverse direction, and wherein the straight regions of the first and second main surfaces have normal vectors that extend parallel to the thickness direction of the elongate base profile of the device.

2. The device according to claim 1, wherein superposition of the at least one concave region of the first main surface with the at least one straight region of the second main surface is designed symmetrically.

3. The device according to claim 1, wherein the elongate base profile is produced from plastic by extrusion.

4. The device according to claim 1, wherein a material from which the elongate base profile is made comprises polyketones and/or polyamide.

5. The device according to claim 1, wherein the device comprises a first connection portion at a first of the two longitudinal ends and a second connection portion at a second of the two longitudinal ends, where the first and second connection portions are configured to introduce fluid flowing into the first and/or second connection portions into the elongate base profile or to discharge fluid coming from the elongate base profile out of the first and/or second connection portions.

6. The device according to claim 5, wherein the first and second connection portions are non-detachably connected to the respective longitudinal end of the elongate base profile in a fluid-tight manner.

7. The device according to claim 5, wherein each of the first and second connection portions has an inlet, an outlet and a branch opening, and where each of the first and second connection portions is fluidically connected to the elongate base profile at the respective branch opening.

8. The device according to claim 7, wherein the device is a first device, wherein the first connection portion of the first device is designed to fit a first connection portion of a second device, and wherein the second connection portion of the first device is designed to fit a second connection portion of the second device, such that the inlet of the first connection portion of the first device can be connected in a fluid-tight manner to an outlet of the first connection portion of the second device, and the outlet of the second connection portion of the device can be connected in a fluid-tight manner to an inlet of the second connection portion of the second device.

9. The device according to claim 8, wherein the inlet of the first connection portion of the device and the outlet of the first connection portion of the second device are configured to latch together, such that an unintentional disengagement of the inlet of the first connection portion of the device from the outlet of the first connection portion of the second device can be prevented.

10. The device according to claim 1, wherein at least one of the longitudinal ends of the elongate base profile is widened, so that a flow cross-section of each fluid flow channel of the plurality of fluid flow channels is enlarged.

11. A cooling system, comprising at least two devices according to claim 1, wherein each of the at least two devices comprises a first connection portion connected to a first of the two longitudinal ends and a second connection portion connected to a second of the two longitudinal ends of the respective elongate base profile, wherein a first device of the at least two devices is connected to a second device of the at least two devices in such a manner that an outlet of the first connection portion of the first device is connected in a fluid-tight manner to an inlet of the first connection portion of the second device and/or an inlet of the second connection portion of the first device is connected in a fluid-tight manner to an outlet of the second connection portion of the second device.

12. The cooling system according to claim 11, wherein an intermediate piece is arranged between the outlet of the first connection portion of the first device and the inlet of the first connection portion of the second device and/or an intermediate piece is arranged between the inlet of the second connection portion of the first device and the outlet of the second connection portion of the second device, the intermediate piece(s) extending a fluid channel formed by the respective outlet and the respective inlet in such a manner that a distance between the elongate base profiles of the at least two devices is increased.

13. The cooling system according to claim 11, wherein the elongate base profile of the first device is arranged mirrored with respect to an elongate base profile of the second device, that is, a concave region of the elongate base profile of the first device is directly opposite a concave region of the elongate base profile of the second device, or a straight region of the elongate base profile of the first device is directly opposite a straight region of the elongate base profile of the second device.

14. Method for producing a device for regulating a temperature of cylindrical components, wherein the method comprises the steps of:

a) extruding an elongate base profile made of plastic, which has a first main surface and a second main surface, each of which, when viewed in a longitudinal direction, extends between two longitudinal ends of the elongate base profile and, when viewed in a transverse direction, extend between two side surfaces, wherein the elongate base profile defines in an interior of the elongate base profile a plurality of fluid flow channels, the plurality of fluid flow channels comprising at least two fluid flow channels, which each extend from one longitudinal end of the base elongate profile to another longitudinal end of the elongate base profile, wherein the plurality of fluid flow channels are arranged in series in the transverse direction and are defined by the first main surface, the second main surface, the two side surfaces, and webs, wherein the webs delimit individual fluid flow channels from one another;

b) deforming the elongate base profile by a thermoforming method in such a manner that the first and second main surfaces each have an alternating sequence of concave regions and straight regions, wherein a concave region of the first main surface, when viewed in a thickness direction of the elongate base profile, which extends both orthogonally to the longitudinal direction and orthogonally to the transverse direction, is at least in part superposed by a straight region of the second main surface, wherein at least one of the straight regions substantially defines a plane which extends in the longitudinal direction and the transverse direction, and wherein the straight regions of the first and second main surfaces have normal vectors that extend parallel to the thickness direction of the elongate base profile of the device;

c) connecting a first of the two longitudinal ends of the elongate base profile with a first connection portion and connecting a second of the two longitudinal ends of the elongate base profile with a second connection portion in order to produce a first device;

d) repeating steps a) to c) to produce a second device; and e) connecting the first device to the second device in such a manner that an outlet of the first connection portion of the first device is fluid-tightly connected to an inlet of the first connection portion of the second device and/or an inlet of the second connection portion of the first device is fluid-tightly connected to an outlet of the second connection portion of the second device.

* * * * *